(12) United States Patent
Bonald

(10) Patent No.: US 7,508,783 B2
(45) Date of Patent: Mar. 24, 2009

(54) METHOD FOR SELECTING A TRANSMISSION CHANNEL WITH A TDMA (TIME DIVISION MULTIPLE ACCESS) AND COMMUNICATION SYSTEM USING SUCH A METHOD

(75) Inventor: Thomas Bonald, Voisins le Bretonneux (FR)

(73) Assignee: France Telecom, Paris (FR)

( * ) Notice: Subject to any disclaimer, the term of this patent is extended or adjusted under 35 U.S.C. 154(b) by 711 days.

(21) Appl. No.: 10/825,245

(22) Filed: Apr. 16, 2004

(65) Prior Publication Data

US 2004/0218560 A1 Nov. 4, 2004

(30) Foreign Application Priority Data

Apr. 30, 2003 (FR) .................................. 03 05381

(51) Int. Cl.
 *H04B 7/212* (2006.01)
(52) U.S. Cl. ........................ 370/321; 442/337; 442/347
(58) Field of Classification Search ................. 370/321, 370/337, 347, 442
 See application file for complete search history.

(56) References Cited

U.S. PATENT DOCUMENTS

| 4,357,700 A | * 11/1982 | Alvarez et al. ............... 370/317 |
| 6,449,490 B1 | 9/2002 | Chaponniere et al. |
| 2002/0183066 A1 | 12/2002 | Pankaj |

* cited by examiner

*Primary Examiner*—Lester Kincaid
*Assistant Examiner*—Diego Herrera
(74) *Attorney, Agent, or Firm*—Young & Thompson

(57) ABSTRACT

A method for selecting transmission channels in a time data multiple access protocol and to a communication system using the method. Based on indications of transmission quality of each channel stored during a time window, one channel is selected that has the best current transmission quality indication position relative to those stored during the time window. This can be used to take advantage of independent variations in the quality of transmission of each channel while providing equitable access to the transmission resource.

17 Claims, 4 Drawing Sheets

METHOD FOR SELECTING A TRANSMISSION CHANNEL WITH A TDMA (TIME DIVISION MULTIPLE ACCESS) AND COMMUNICATION SYSTEM USING SUCH A METHOD

BACKGROUND OF THE INVENTION

The present invention relates to a method of selecting transmission channel in a time division multiple access protocol and to a communication system using the method of the invention.

In the state of the art, for time division multiple access protocols, methods have already been proposed for selecting a transmission channel from a plurality of transmission channels as a function of the transmission conditions measured on each of those channels. These methods apply in particular to the case of a radio transmission between a base station and a set of mobile telephones, the quality of transmission of each channel linking the base station to a mobile telephone varying independently according to the mobility of the telephone and the change in its radio environment.

Thus a method described in document U.S. Pat. No. B1-6,449,490 consists in:
 receiving for each channel a value representing the transmission rate currently achievable on that channel;
 determining for each channel the transmission rate achieved on that channel during a time window;
 selecting the channel for which the ratio of transmission rate currently achievable to the transmission rate achieved during a time window is the highest.

The value of this method relative to a selection method that does not take account of the variations in the quality of transmission of the channels is to increase the transmission rate of each channel by selecting the one on which the transmission conditions are the most favourable. The selection is made on the basis of the ratio of the transmission rate achievable to the transmission rate achieved to provide relatively equitable access to the transmission resource. The drawback of this method is that a channel on which the achieved rate would be limited for a reason other than the sharing of the transmission resource (a constraint linked to the reception capability of the mobile telephone for example) could be selected systematically, even when its transmission conditions are bad.

Another method aiming to take advantage of the independent variations in the transmission quality of the channels and described in the same document consists in:
 receiving for each channel a periodic indication of the transmission quality of that channel;
 computing for each channel the average transmission quality of that channel;
 selecting the channel for which the ratio of the last transmission quality indication to the average transmission quality is the highest.

When applying this teaching of the art, it emerges that certain channels would be allocated a much larger portion of the transmission resource than others. In fact, the distribution of the transmission resource depends on the distribution of the random variations of the transmission conditions of the set of channels. In addition, this distribution of the resource and the transmission quality of each resultant selected channel are extremely difficult to evaluate when the distributions of random variations of the transmission conditions of the channels differ, which is the case in practice.

SUMMWRY OF THE INVENTION

The present invention provides a remedy for these drawbacks in the state of the art. Specifically, the method of the invention makes it possible to select the channel that has the best transmission conditions, relative to the transmission conditions of this channel during a time window, while ensuring that all the channels have equitable access to the transmission resource irrespective of the distributions of random variations of the transmission conditions of the channels. In addition, the transmission quality of each selected channel is easy to evaluate and is a function only of the distribution of random variations of the transmission conditions of that channel, not of those of all the channels.

Specifically, the invention relates to a method of selecting at least one transmission channel from a plurality of transmission channels, in a time division multiple access protocol. According to the invention, the selection method consists in:
 receiving for each channel a periodic indication of the transmission quality of that channel;
 storing these indications for each channel during a time window;
 selecting at least one channel that has the best current transmission quality indication position relative to the transmission quality indications stored for that channel during the time window.

According to one aspect of the invention, the step of selecting at least one channel is carried out from a plurality of channels over which data are to be transmitted and consists in selecting from these channels at least one channel that has the best or amongst the best current transmission quality indication position(s) relative to the transmission quality indications stored for that channel during the time window.

According to another aspect of the invention, the method consists in determining the number of channels N, the time window of size T, and the initial values of the transmission qualities of each channel during the time window and in that these parameters may be updated by interrupting the method at moments chosen by a reinitialization finite state machine, particularly when the number of channels N changes due to the activity of the users.

According to another aspect of the invention, the method consists in executing, during each unit of time, the said series of instructions consisting in:
 executing a loop to determine for each channel the position of the current transmission quality indication relative to those stored for that channel during the time window;
 selecting from the channels for which data are to be transmitted at least one channel that has the best or one amongst the best value(s);
 giving transmission authorization at least to the channel.

According to another aspect of the invention, the loop consists, for each channel, in:
 acquiring at least one transmission quality indication of the channel, that is $C_i(t)$;
 initializing a value of position $P_i$ at 1;
 executing a second loop in order to determine a value indicative of the position $P_i$;
 executing a third loop in order to update the transmission quality indications of the channel during the time window.

According to another aspect of the invention, the second loop consists, for each loop index (k, where k is from 1 to T), in:

evaluating the result of a test defined by the relation: $C_i(t-k) > C_i(t)$;

incrementing the indication of position Pi by one unit if the result of the test is positive;

otherwise, evaluating the result of a test defined by the relation ($C_i(t-k) = C_i(t)$) AND (RAND<1) where RAND is a function returning a random variable, in particular uniformly distributed over the interval [0,2];

re-executing the step of incrementing the indication of position Pi if the result of the test is positive.

According to another aspect of the invention, the third loop consists, for each loop index (k, where k is from T to 1), in:

assigning the previously stored value $C_i(t-k+1)$ to the variable $C_i(t-k)$.

According to another aspect of the invention, a convention such as a random choice is applied when several channels for which data are to be transmitted have a minimum indication of position Pi.

According to another aspect of the invention, the method consists, if several channels are authorized to transmit simultaneously, in selecting from the channels for which data are to be transmitted those that have the best position Pi and in giving transmission authorization to those channels.

According to another aspect of the invention, the second test executes a predetermined convention to calculate the position Pi when the current transmission quality indication of the channel, that is $C_i(t)$, is equal to one or more values during the time window.

According to another aspect of the invention, the loops are, partially or wholly, processed in parallel and not sequentially.

The invention also relates to a communication system using the method of the invention, characterized in that it comprises:

a method for receiving, for at least one channel, a periodic indication of transmission quality of that channel;

a memory for storing the transmission quality indications of each channel during a time window;

a computing circuit to determine, for each channel for which a periodic indication of transmission quality has been received, the position of the current transmission quality indication of that channel relative to those stored for that channel during the time window;

a circuit for selecting at least one transmission channel that has the best or amongst the best current transmission quality indication position(s) relative to those stored for that channel during the time window.

According to another aspect of the invention, the circuit for selecting at least one transmission channel comprises a means of selecting channels from a set of channels over which data are to be transmitted and that have the best or one amongst the best current transmission quality indication position(s) relative to the positions stored for that channel or those channels during the time window.

According to another aspect of the invention, the system comprises at least one circuit for acquiring the transmission quality signal of the channel, that is $C_i(t)$ on the date t.

According to another aspect of the invention, the system comprises at least one memory consisting of T blocks, each block k containing the value of transmission quality of the channel i on the date (t−k), that is $C_i(t-k)$, where k is from 1 to T.

According to another aspect of the invention, the system comprises at least one set of T comparison circuits, each circuit comparing the current transmission quality indication contained in at least the acquisition circuit with the transmission quality indication on the date t−k contained in the memory block k, where k is from 1 to T.

According to another aspect of the invention, the system comprises at least one adder, to the input of which is connected the output of each comparison circuit, where k is from 1 to T, and an independent input always giving the value 1.

BRIEF DESCRIPTION OF THE DRAWINGS

The features and advantages of the present invention will be better understood with the aid of the drawings appended and described below.

DESCRIPTION OF THE PREFERRED EMBODIMENTS

Figure 1:
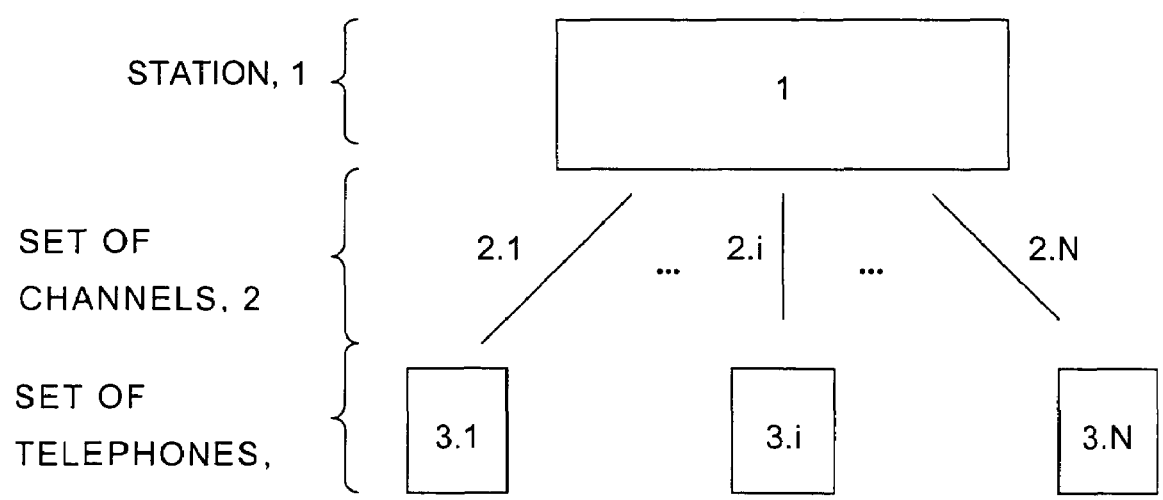
FIG. 1 is a block diagram representing a communication system used in the invention.

FIG. 1 shows the simplified architecture of a communication system using a time division multiple access protocol. Such a communication system comprises a common station 1, the master with respect to a set 3 of N telephones which share one and the same transmission resource. Although the number N of telephones has been chosen to be fixed in the present description, it is clear that this number may vary in practice according to the activity of the users sharing the communication system. A set 2 of N transmission channels connects the station to the set 3 of telephones. 2_i identifies the transmission channel connecting the station 1 to the telephone 3_i, where i is from 1 to N. At a given moment, the channel 2_i is said to be active if data are to be transmitted over that channel, and it is said to be inactive otherwise. Access to the transmission resource is usually sequential, transmission authorization being given at any moment by the station 1 to one and only one of the channels 2_i. In a particular embodiment, the station may however authorize several channels to transmit simultaneously.

Each channel 2_i is usually a microwave communication channel the quality of which depends in particular on the distance separating the station 1 from the corresponding telephone 3_i and on the interference induced by various radio phenomena on the microwave path. In a particular embodiment, the transmissions are made in the downlink direction, that is to say from the station 1 to the set 3 of telephones. The quality of transmission of each channel 2_i is then measured on the corresponding telephone 3_i by means, for example, of a pilot signal transmitted by the station 1, and an indication of that transmission quality is periodically sent by the telephone 3_i to the station 1, where appropriate over a channel distinct from the transmission channel 2_i. When this transmission quality indication is not received by the station 1 or is errored, an arbitrary value is used such as the last indication of transmission quality received for example. In another embodiment, the transmissions are made in the uplink direction, that is to say from the set 3 of telephones to the station 1. The transmission quality of each channel is then measured directly by the station 1.

The station 1 selects from the active channels the one that has the best current transmission quality indication position relative to those stored, according to a method described hereafter, and authorizes that channel to transmit for a certain time. In a particular embodiment, this authorization takes effect only if the transmission resource is available, the latter being able to be used by one of the channels having previously been authorized to transmit and still being authorized to transmit, or by a channel not belonging to the set 2 of channels in question. In a particular embodiment in which the station 1 authorizes, where appropriate, several channels to transmit simultaneously, the selected channels are those that have the best current transmission quality indication positions relative to those stored respectively for each of those channels.

Figure 2:
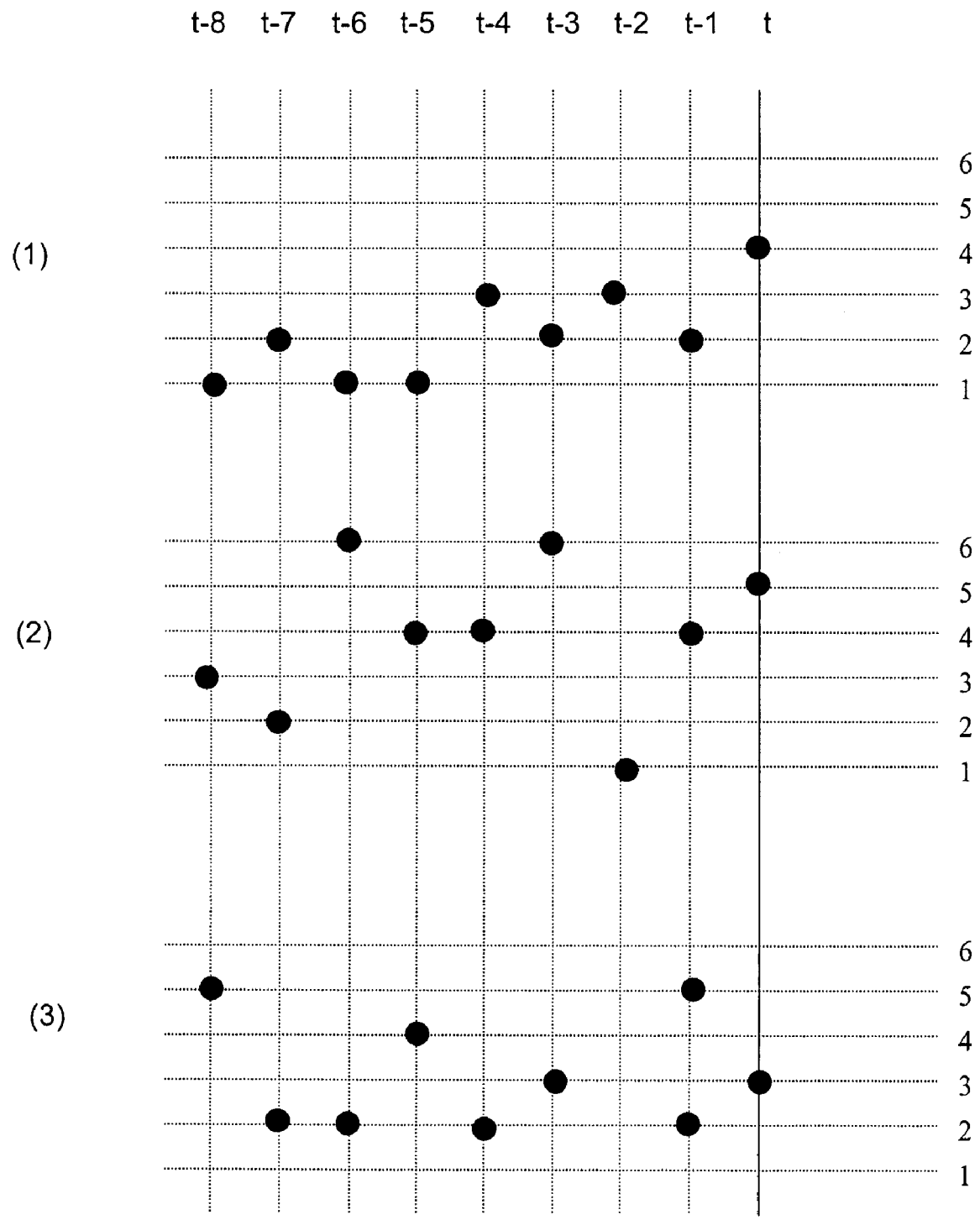
FIG. 2 is a timing diagram representing the change of transmission quality of three channels and used to explain the method of the invention.

FIG. 2 shows a timing diagram representing the change in the quality of transmission of N=3 channels and helping to explain the channel selection principle used by the method of the invention. In this example, the transmission quality indications may take a set of six values—1,2,3,4,5,6—corresponding to an increasing quality of transmission: the value 1 indicates a bad transmission quality, the value 6 a good transmission quality. The sets of values (1), (2) and (3) give the transmission quality indications received by the station 1 in each unit of time for the channels 2_1, 2_2 and 2_3 respectively and stored in a time window chosen here to be of size T=8 units of time. The transmission quality indication of the channel 2_i on the date t is marked as $C_i(t)$ and $P_i(t)$ is the position of that value relative to those stored during the time window.

It can be seen in the diagram (1) that the transmission quality indication of the channel 2_1 on the current date t is $C_1(t)=4$, whereas the values stored for that channel during the time window are $C_1(t-k)=2,3,2,3,1,1,2,1$, where k is from 1 to T. Since $C_1(t)>C_1(t-k)$ where k is from 1 to T, the current transmission quality is in the first position relative to those stored during the time window, that is $P_1(t)=1$. Likewise, it can be seen in the diagram (2) that the transmission quality indication of the channel 2_2 on the current date t is $C_2(t)=5$, in third position relative to those stored during the time window, that is $P_2(t)=3$. When the current transmission quality indication of a channel is equal to one or more values stored during the time window, a convention is adopted to decide its position. Thus, it can be seen in diagram (3) that the transmission quality indication of the channel 2_3 on the current date t is $C_3(t)=3$, equal to the value $C_3(t-3)$, in fourth or fifth position relative to those stored during the time window according to the chosen convention. In a particular embodiment, the position of the current transmission quality indication relative to those stored of the same value is chosen at random. Thus, according to the result of a random test, the current transmission quality indication position of the channel 2_3 will be $P_3(t)=4$ or $P_3(t)=5$.

The channel selected on the date t is the active channel that has the best current transmission quality position. Since $P_1(t)<P_2(t)<P_3(t)$ in the case of FIG. 2, the selected channel is the channel 2_1 if this channel is active, the channel 2_2 if the channel 2_1 is inactive and the channel 2_2 is active, and the channel 2_3 if the channels 2_1 and 2_2 are inactive. When several of the active channels achieve the minimum value $P_i(t)$, a convention is adopted to decide which of these channels to select. In a particular embodiment, one of these channels is chosen at random.

In one embodiment in which the station may authorize several channels to transmit simultaneously, the selected channels are the active channels that have the best current transmission quality indication positions relative to those stored respectively for each of those channels during the time window. Since $P_1(t)<P_2(t)<P_3(t)$ in the case of FIG. 2, supposing for example that all three channels are active, it emerges that the selected channels are the channel 2_1, the channels 2_1 and 2_2, or all three channels, depending on the number of channels to be selected. As explained above, a convention is adopted in the event of various channels having equal positions $P_i(t)$, such as a random choice of a subset of these channels for example.

Figure 3:
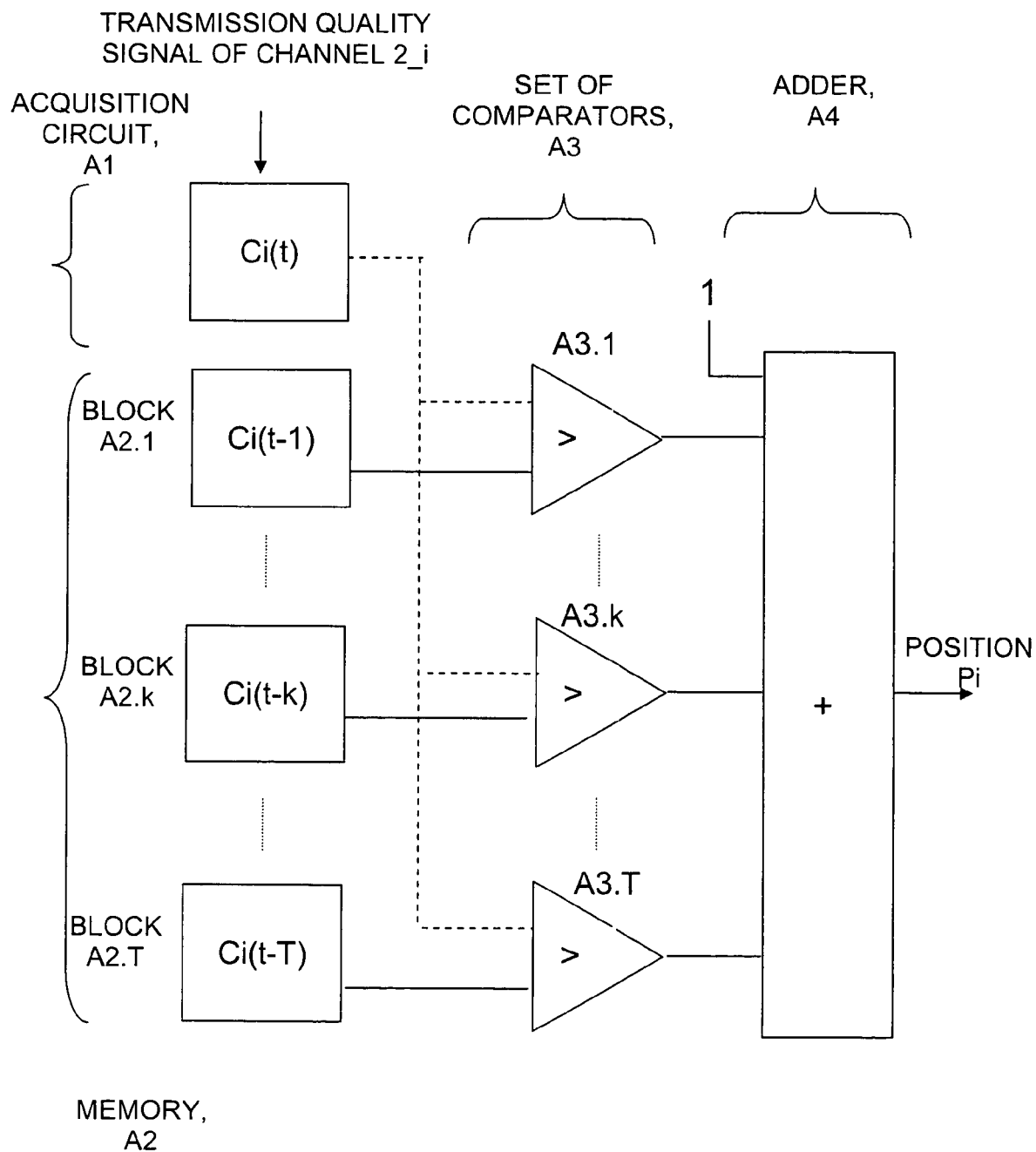
FIG. 3 is a block diagram representing a system of computing the current transmission quality indication position of a channel relative to those stored for that channel so that the transmission channel can be selected according to the method of the invention.

FIG. 3 shows the simplified architecture of a system of computing the position $P_i(t)$ of the transmission quality of a channel 2_i on the date t relative to the previous values stored during the time window. This system primarily comprises:

a circuit A1 for acquiring the transmission quality signal of the channel 2_i, that is $C_i(t)$ on the date t;

a memory A2 consisting of T blocks, each block A2.k containing the transmission quality value of the channel 2_i on the date t−k, that is $C_i(t-k)$, where k is from 1 to T;

a set A3 of T comparison circuits, each circuit A3.k comparing the current transmission quality indication contained in the circuit A1 and the transmission quality indication on the date t−k contained in the memory block A2.k, where k is from 1 to T; and an adder A4, to the input of which is connected the output of each comparison circuit A3.k, where k is from 1 to T, and also an independent input always giving the value 1.

On the date t, the transmission quality values of the channel 2_i previously contained in the circuit A1 and the memory A2, which were updated on the date t−1, are offset so that the block A2.1 contains on the date t the value $C_i(t-1)$ previously contained in the acquisition circuit A1, and each block A2.k contains on the date t the value $C_i(t-k)$ previously contained in the block A2.(k−1), where k is from 2 to T. The transmission quality of the channel 2_i on the date t, that is $C_i(t)$, is acquired by the circuit A1.

Each comparison circuit A3.k returns the value 1 if $C_i(t)<C_i(t-k)$ and 0 if $C_i(t)>C_i(t-k)$. If $C_i(t)=C_i(t-k)$, the circuit A3.k returns the value 0 according to one embodiment, the value 1 according to another embodiment, the value 1 if the result of a random test is positive, the value 0 otherwise, according to a third embodiment. The position $P_i(t)$ of the transmission quality indication of the channel 2_i on the date t relative to those stored for that channel during the time window is given at the output of the adder A4.

Figure 4:
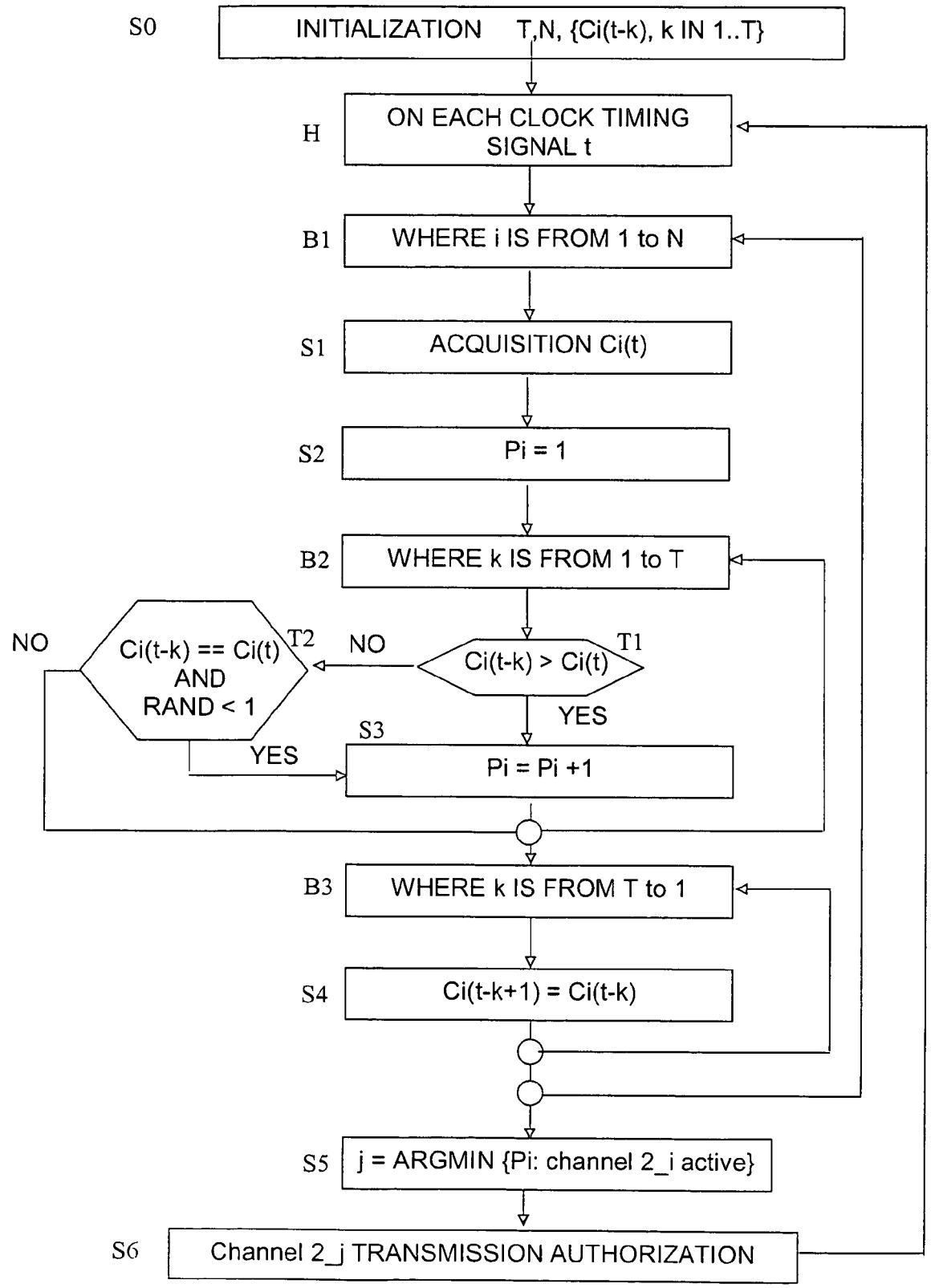
FIG. 4 is a flowchart of the method of the invention.

FIG. 4 gives a flowchart of one embodiment of the method of the invention.

In a step S0, the number of channels N, the time window T, and the transmission quality values of each channel during the time window are initialized. These parameters may be updated by interrupting the method at times chosen by a reinitialization finite state machine, in particular when the number of channels N changes due to the activity of the users, as mentioned hereinabove. The determination of the reinitialization finite state machine is not within the scope of the present application.

The control then executes in each unit of time, driven by a clock H, a series of instructions which may be interrupted in particular by the reinitialization finite state machine mentioned hereinabove. This series of instructions consists in:

executing the loop B1 described hereinafter in order to determine for each channel 2_i the position $P_i$ of the current transmission quality indication relative to those stored for that channel during the time window;

selecting, during a step S5, from the active channels a channel 2_j of which the value $P_j$ is minimum;

during a step S6, giving transmission authorization to channel 2_j.

The loop B1 consists, for each channel 2_i, where i is from 1 to N, in:
  acquiring, during a step S1, a transmission quality indication of the channel 2_i, that is Ci(t);
  initializing, during a step S2, the value of Pi at 1;
  executing the loop B2 described hereinafter in order to determine the value of Pi;
  executing the loop B3 described hereinafter in order to update the transmission quality indications of the channel 2_i during the time window.

The loop B2 consists, for each k, where k is from 1 to T, in:
evaluating the result of the test T1: Ci(t−k)>Ci(t);
incrementing Pi by one unit during a step S3 if the result of the test T1 is positive;
otherwise, evaluating the result of the test T2: (Ci(t−k)==Ci(t)) AND (RAND<1) where RAND is a function returning a random variable uniformly distributed over the interval [0,2];
executing the step S3 if the result of the test T2 is positive.

The loop B3 consists, for each k, where k is from T to 1, in:
assigning the value Ci(t−k+1) to the variable Ci(t−k) during a step S4.

It is clear that a convention such as a random choice is applied in step S4 when several active channels have a minimum value Pi. It is also clear that, in a particular embodiment in which the station 1 authorizes several channels to transmit simultaneously, the step S4 consists in selecting from the active channels those for which the value Pi is the smallest and the step S5 consists in giving transmission authorization to those channels.

It is clear that any convention other than the random choice of the test T2 may be applied to compute the value of Pi when the current transmission quality indication of the channel, that is Ci(t), is equal to one or more values of the time window.

It is clear that the loops B1, B2, B3 may be, partially or wholly, processed in parallel and not sequentially.

The invention claimed is:

1. Method of selecting at least one transmission channel from a plurality of transmission channels, associated with a common station in a time division multiple access protocol, comprising the steps of:
   receiving by the common station for each channel a periodic indication of the transmission quality of that channel;
   storing each of the periodic indications received for each channel during a time window;
   determining, for each channel, the number of stored periodic indications during the time window for a respective channel that are better than a current transmission quality indication for the respective channel, to provide a rank of the respective channel based on the number of stored periodic indications; and
   selecting at least one channel from among the plurality of transmission channels that has a best rank.

2. Method according to claim 1, further comprising a step (S0) that comprises determining the number of channels N, the size of the time window T and the initial values of the transmission qualities of each channel during the time window, and updating these parameters by interrupting the method at moments chosen by a re-initialization finite state machine.

3. Method of selecting at least one transmission channel from a plurality of transmission channels, associated with a common station in a time division multiple access protocol, comprising the steps of:
   receiving by the common station for each channel a periodic indication of the transmission quality of that channel;
   storing these indications for each channel during a time window;
   selecting at least one channel from among the plurality of transmission channels that has a best rank, the rank being a number of stored indications for the respective channel during the time window that are better than a current transmission quality indication,
   wherein the method includes executing, during each unit of time, the series of instructions comprising:
     executing a loop (B1) to determine for each channel (2_i) the rank (Pi);
     selecting, during a step (S5), from the channels for which data are to be transmitted at least one channel (2_j) that has the best rank (Pj); and
     during a step (S6), giving transmission authorization at least to the channel (2_j).

4. Method according to claim 3, wherein the loop (B1) comprises, for each channel (2_i, where i is from 1 to N):
   acquiring, during a step (S1), a transmission quality indication of the channel (2_i), that is Ci(t);
   initializing, during a step (S2), the rank Pi at 1;
   executing a second loop (B2) in order to determine the rank (Pi); and
   executing a third loop (B3) in order to update the transmission quality indications of the channel (2_i) during the time window.

5. Method according to claim 4, wherein the loop (B2) comprises, for each ioop index (k, where k is from 1 to T):
   evaluating the result of a test (T1) defined by the relation: Ci(t−k) >Ci(t);
   incrementing the rank (Pi) by one unit during a step (S3) if the result of the test (T1) is positive;
   otherwise, evaluating the result of a test (T2) defined by the relation (Ci(t−k)==Ci(t)) AND (RAND>1) where RAND is a function returning a random variable, in particular uniformly distributed over the interval [0,2]; and
   executing the step (S3) of incrementing the rank (Pi) if the result of the test (T2) is positive.

6. Method according to claim 4, wherein the loop (B3) comprises, for each loop index (k, where k is from T to 1):
   assigning the previously stored value Ci(t−k+1) to the variable Ci(t−k) during a step (S4).

7. Method according to claim 6, wherein a random choice is applied to the step (S4) when several active channels have the same best rank (Pi).

8. Method according to claim 6, wherein when several channels are authorized to transmit simultaneously, the step (S4) comprises selecting from the channels for which data are to be transmitted those that have the best rank (Pi) and wherein the step (S5) comprises giving transmission authorization to those channels.

9. Method according to claim 5, wherein the second test (T2) executes a predetermined convention to compute the rank (Pi) when the current transmission quality indication of the channel, that is Ci(t), is equal to one or more values of the time window.

10. Method according to claim 4, wherein the loops (B1, B2, B3) are, partially or wholly, processed in parallel and not sequentially.

11. Communication system using the method of claim 1, comprising:
   a receptor for receiving, for at least one channel, a periodic indication of transmission quality of that channel;

a memory for storing each of the periodic transmission quality indications of each channel received during a time window;

a computing circuit to determine, for each channel for which a periodic indication of transmission quality has been received, the number of stored periodic indications during the time window for a respective channel that are better than a current transmission quality indication for the respective channel, to provide a rank of the respective channel based on the number of stored periodic indications;

a circuit for selecting the transmission channel that has the best rank during the time window.

12. Communication system according to claim 11, wherein the circuit for selecting at least one transmission channel comprises a means of selecting channels over which data are to be transmitted and that have the best rank during the time window.

13. Communication system according to claim 11, further comprising at least one circuit (A1) for acquiring the transmission quality signal of the channel ($2\_i$), that is $Ci(t)$ on the date t.

14. Communication system according to claim 11, further comprising at least one memory (A2) of T blocks, each block (A2.k) containing the value of transmission quality of the channel ($2\_i$) on the date (t−k), that is $Ci(t-k)$, where k is from 1 to T.

15. Communication system according to claim 11, further comprising at least one set (A3) of at most T comparison circuits, each circuit (A3.k) comparing the current transmission quality indication contained in at least the circuit (A1) with the transmission quality indication on the date t−k contained in the memory block (A2.k), where k is from 1 to T.

16. Communication system according to claim 11, further comprising at least one adder (A4), to the input of which is connected the output of each comparison circuit (A3.k), where k is from 1 to T, and an independent input always giving the value 1.

17. A method of selecting at least one transmission channel from a plurality of transmission channels, associated with a common station in a time division multiple access protocol, comprising the steps of:

receiving by the common station for each channel periodic indications of the transmission quality of that channel;

storing each of the periodic indications received for each channel during a time window;

determining for each channel a counter indicating, during the time window, a number of times a stored indication for a respective channel is better than a current transmission quality indication for the respective channel; and selecting from among the plural channels at least one channel that has the highest counter.

* * * * *